United States Patent
Huang (10) Patent No.: US 9,204,035 B2
(45) Date of Patent: Dec. 1, 2015

(54) DEVICE AND METHOD FOR CAPTURING IMAGES USING DEPTH-OF-FIELD

(71) Applicant: HON HAI PRECISION INDUSTRY CO., LTD., New Taipei (TW)

(72) Inventor: Jeng-Li Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/194,892

(22) Filed: Mar. 3, 2014

(65) Prior Publication Data

US 2014/0347529 A1  Nov. 27, 2014

(30) Foreign Application Priority Data

May 27, 2013  (TW) .............................. 102118564 A (51) Int. Cl.
 *H04N 5/202*  (2006.01)
 *H04N 5/232*  (2006.01)
 *G06K 9/34*  (2006.01)

(52) U.S. Cl.
 CPC ................................. *H04N 5/23212* (2013.01)

(58) Field of Classification Search
 CPC ............. G06K 9/36; G06K 9/34; G06K 9/40; H04N 5/23232; H04N 5/23238; H04N 5/3415; H04N 9/69
 USPC ............... 348/218.1, 254, 273; 382/106–107, 382/154, 173, 254–255, 276
 See application file for complete search history.

(56) References Cited

U.S. PATENT DOCUMENTS

| | | | | |
|---|---|---|---|---|
| 2006/0078217 | A1* | 4/2006 | Poon et al. | 382/255 |
| 2007/0081081 | A1* | 4/2007 | Cheng | 348/218.1 |
| 2011/0222734 | A1* | 9/2011 | Angot et al. | 382/106 |
| 2012/0069235 | A1* | 3/2012 | Imai | 348/333.11 |
| 2013/0141604 | A1* | 6/2013 | Yang | 348/222.1 |

FOREIGN PATENT DOCUMENTS

| | | |
|---|---|---|
| CN | 102523376 | 6/2012 |
| CN | 102625038 | 8/2012 |

* cited by examiner

*Primary Examiner* — Kelly L Jerabek (74) *Attorney, Agent, or Firm* — Novak Druce Connolly Bove + Quigg LLP (57) ABSTRACT

An image capturing device includes a pre-capturing module, a conversion module, a division module, a ranging module, a calculation module, and an image capturing module. The pre-capturing module obtains an initial image of a view the image capturing device to be captured. The conversion module converts the initial image to a gray scale image. The division module divides the gray scale image into multiple areas. The ranging module calculates an object distance collection of each area, and generates a total object distance collection by integrating the object distance collections. The calculation module calculates image capturing condition which makes a plurality of depth-of-field cover the total object distance collection. The image capturing module captures a plurality of images according to the image capturing condition to form an image array. An image capturing method is also provided.

16 Claims, 6 Drawing Sheets

DEVICE AND METHOD FOR CAPTURING IMAGES USING DEPTH-OF-FIELD

BACKGROUND

1. Technical Field

The present disclosure generally relates to image capturing, and especially relates to a device and method for capturing images.

2. Description of Related Art

Nowadays, a digital camera or a mobile phone is used to capture images. Most of the cameras and the mobile phones use an autofocus technology. However, sometimes happens the area being captured by the camera or mobile phone is out of focus, especially when different subjects are at different distances in the scene.

To overcome the shortcoming described above, a method of capturing images with multiple focuses through infrared automatic focus or contrast automatic focus is used. A plurality of images is captured from the far object distance to the near object distance to form an image array. Each area of the view is checked and the clear image from the image array is picked according to the object distance of the selected area. However, in many cases, when taking a plurality of images from the far object distance to the near object distance, there will be many unused images, resulting in wasted time, storage space, and increased cost of the image capturing device.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used hereinafter, refers to logic embodied in hardware or firmware, or to a collection of software instructions, written in a programming language, such as, for example, Java, C, or assembly. One or more software instructions in the modules may be embedded in firmware such as in an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
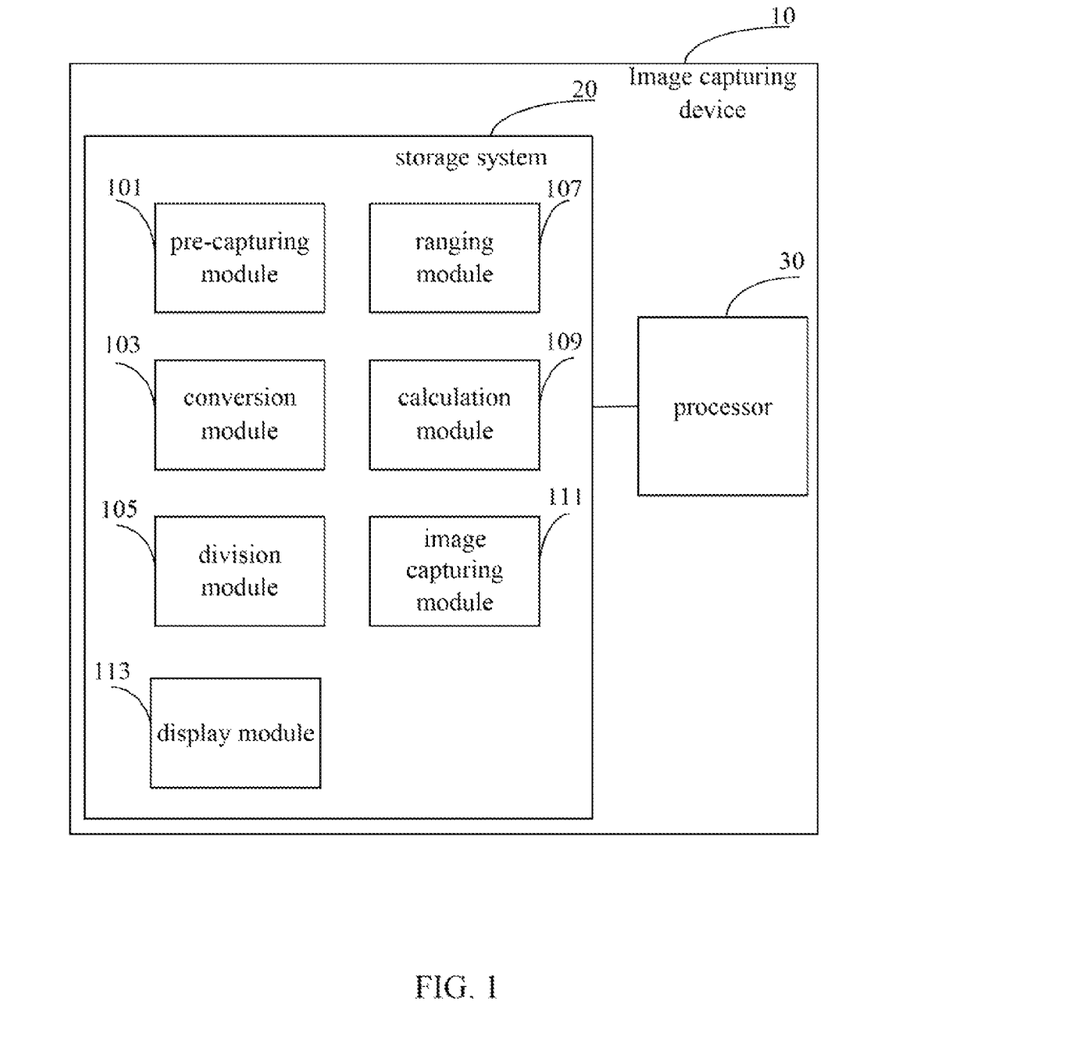
FIG. 1 is a block diagram of one embodiment of an image capturing device.

FIG. 1 is a block diagram of one embodiment of an image capturing device. The image capturing device 10 can be a camera, a mobile phone, or any other device having an image capturing function. In one embodiment, the image capturing device 10 includes a pre-capturing module 101, a conversion module 103, a division module 105, a ranging module 107, a calculation module 109, an image capturing module 111, a processor 30, and a storage system 20. The modules 101-111 can include computerized code in the form of one or more programs. The one or more programs are stored in the storage system 20, and the storage system 20 is a non-transitory device. The computerized code includes instructions that are executed by the processor 30 to provide functions for the modules 101-111.

In one embodiment, the pre-capturing module 101 receives an initial image of a view or a subject the image capturing device will be capturing.

In one embodiment, the conversion module 103 converts the original color image to gray scale image. In one embodiment, the following formula can be used for gray scale transformation: Y=0.299R+0.587G+0.114B, I=0.596R−0.275G−0.321B, U=0.212R−0.528G−0.311B, wherein Y, I, U, R, G, and B represent the color standard in industry.

Figure 2:
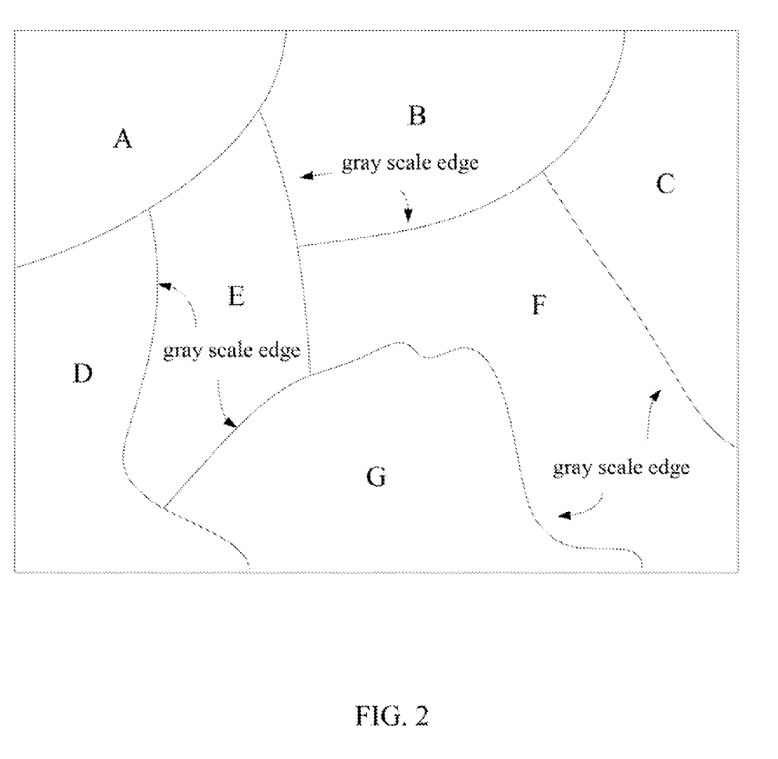
FIG. 2 is a schematic diagram of one embodiment of an image divided into multiple areas.

In one embodiment, the division module 105 divides the gray scale image into multiple areas. Because the initial image can have different colors in different areas, after the gray scale transformation, the gray scale value of the different areas can be different. When the gray scale value has obvious changes between the different areas, multiple gray scale edges will form on the gray scale image. The division module 105 divides the gray scale image into multiple areas based on the gray scale edges. FIG. 2 is one embodiment of an image divided into multiple areas. The gray scale image has been divided into 7 areas based on the gray scale edges. Because the object distance of the areas having the same color are mostly continuous, after the gray scale transformation, the gray scale value of the areas having the same color are adjacent, and these areas will be at the same gray scale edges. When the division module divides the gray scale image into multiple areas based on the gray scale edges, the object distance of the multiple areas will be continuous due to the adjacent gray scale value. Therefore, the entire image is divided into multiple areas, and the object distance of each area is continuous.

In one embodiment, the ranging module 107 calculates an object distance collection of each area and generates a total object distance collection by integrating the object distance collections. The object distance refers to the distance from the subject to the lens of the image capturing device, and can be calculated by the imaging formula. In the embodiment, the ideal optical imaging formula of the spherical mirror is 1/f=1/u+1/v, wherein f is the focus distance, u is the image distance and v is the object distance. When focusing on each area, the focus distance and the image distance can be obtained, and the object distance can be calculated by the imaging formula. When all the object distances of each area are calculated, the ranging module 107 combines the object distances overlapping into one object distance collection and takes the object distance without overlap as one object distance collection. The total object distance collection is all of the object distance collections generated in the ranging module. In this way, the object distance not in the preliminary view can be ruled out, becoming convenient for subsequent image capturing.

Figure 3:
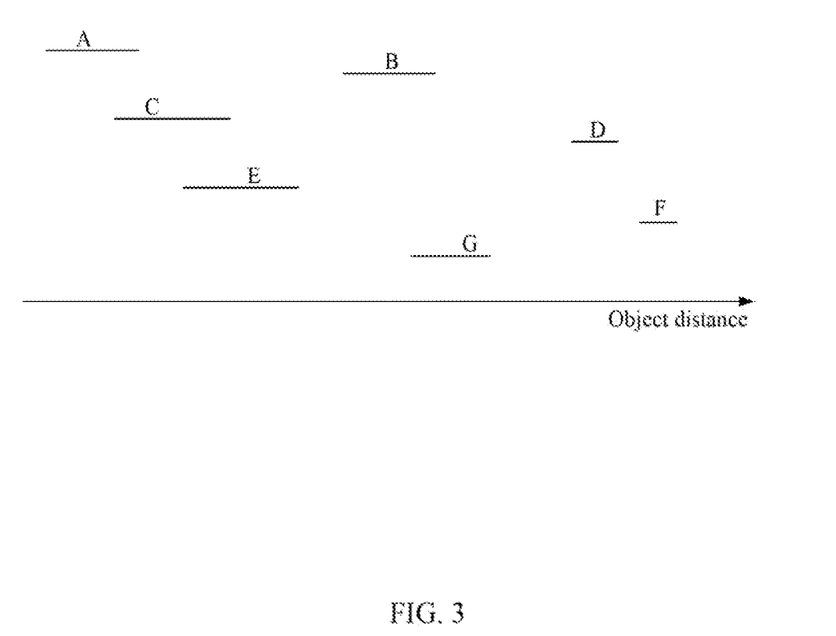
FIG. 3 is a schematic diagram of one embodiment of an object distance of each of the multiple areas of the image of FIG. 2.

FIG. 3 is a schematic diagram of one embodiment of an object distance of the multiple areas of the image of FIG. 2. In the coordinate system, the object distances are on the horizontal axis, and the lines A-G represents the object distance collection of the areas A-G.

Figure 4:
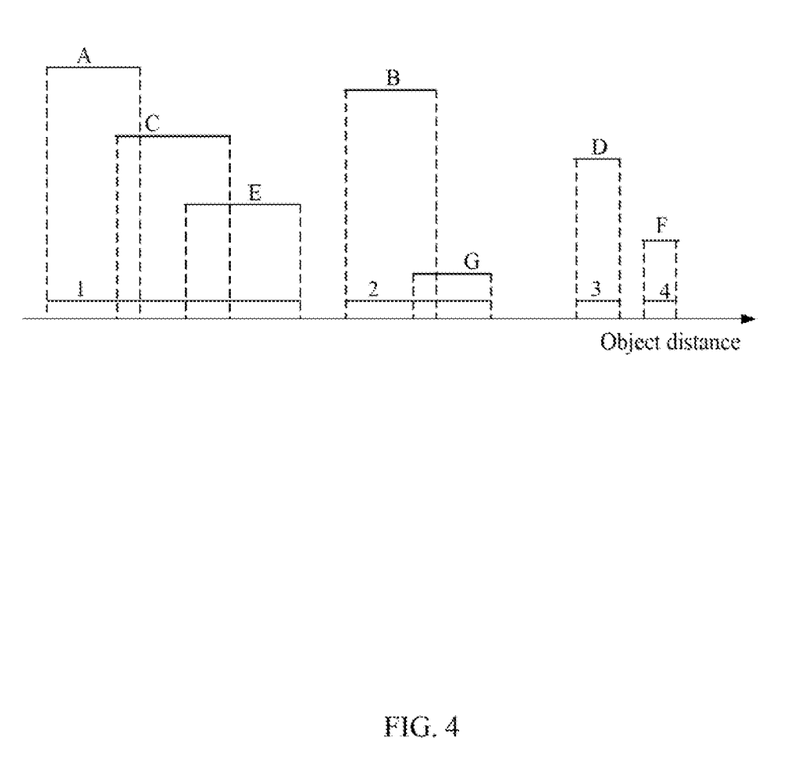
FIG. 4 is a schematic diagram of a total object distance collection of the image of FIG. 2.

FIG. 4 is a schematic diagram of a total object distance collection of the image of FIG. 2. As there is overlapping among the lines A, C and E, which stand for the object distance of areas A, C and E overlapping, the ranging module combines the object distances of A, C and E into one object distance collection. The line 1 represents the combined object distance collection of areas A, C and E. The line 2 represents the combined object distance collection of areas B and G. Since the object distance of area D and F has no overlap, the ranging module takes the object distance as one object distance collection. The object distance collection of each area represent by the lines A-G are combined into the total object distance collection represented by the lines 1-4. There is no overlap between the lines 1-4.

The calculation module 109 calculates image capturing conditions which makes a plurality of depth-of-field cover the total object distance collection. The depth-of-field refers to the combination of the front depth-of-field and the back depth-of-field, the view in the depth-of-field will be clear. The formula for the front depth-of-field=(H*D)/(H+D−F), and the back depth-of-field=(H*D)/(H−D−F), wherein D is the object distance, F is the focus distance, and H is the hyper focal distance. The hyper focal distance is the distance beyond which all objects are acceptably sharp for a lens focused at infinity, and the hyper focal distance depends on the focus distance of the lens, the aperture coefficient, and the dispersion circle diameter. The dispersion circle diameter is the minimum diameter when the light beam is focused on the image plane. The dispersion circle diameter is usually known. Therefore, the depth-of-field not only depends on the object distance of the preliminary view, but also depends on the image capturing condition such as the focus distance and the aperture coefficient of the image capturing device. The plurality of depth-of-field covers the total object distance collection by adjusting the focus distance and the aperture coefficient. Meanwhile, since the focus distance and the aperture coefficient are only adjustable in a certain range, the depth-of-field is also in a certain range under the condition of a certain distance.

In one embodiment, when the total object distance collection is generated, the calculation module 109 calculates the image capturing condition. The calculation module 109 selects one object distance collection from the total object distance collection and averages the object distance collection into N pieces, wherein N is a positive integer starting from 1. The calculation module 109 takes the minimum of each piece of the selected object distance collection as the front depth-of-field, the maximum of each piece of the selected object distance collection as the back depth-of-field, and the average of the minimum and the maximum as the shooting object distance. According to the formula for the front depth-of-field=(H*D)/(H+D−F), and the back depth-of-field=(H*D)/(H−D−F), the calculation module 109 calculates the image capturing conditions such as the focus distance and the aperture coefficient and determines whether the conditions can be adjusted by the image capturing device. When the conditions are not adjustable, the calculation module 109 averages the object distance collection into N+1 pieces and calculates the image capturing conditions again until all the conditions can be adjusted. The calculation module then selects the next object distance collection and calculates the image capturing conditions again until all the image capturing conditions make the plurality of depth-of-field cover the total object distance collection.

For instance, the calculation module 109 selects one object distance collection first. The calculation module 109 then takes the minimum of the selected object distance collection as the front depth-of-field, the maximum of each piece of the selected object distance collection as the back depth-of-field, and the average of the minimum and the maximum as the shooting object distance. The calculation module 109 calculates the image capturing condition and determines whether the condition is adjustable. If the condition taken for the first time is not adjustable, then the calculation module 109 averages the object distance collection into 2 pieces and calculates the conditions for each piece again. In addition, if the conditions taken for the second time are not adjustable, the calculation module 109 averages the object distance collection into 3 pieces and calculates the conditions for each piece again. That is, if the conditions taken for the Nth time are not adjustable, the calculation module 109 averages the object distance collection into N+1 pieces and calculates the conditions for each piece again. Thus, the image capturing conditions that make the plurality of depth-of-field covering the total object distance collection can be calculated.

Figure 5:
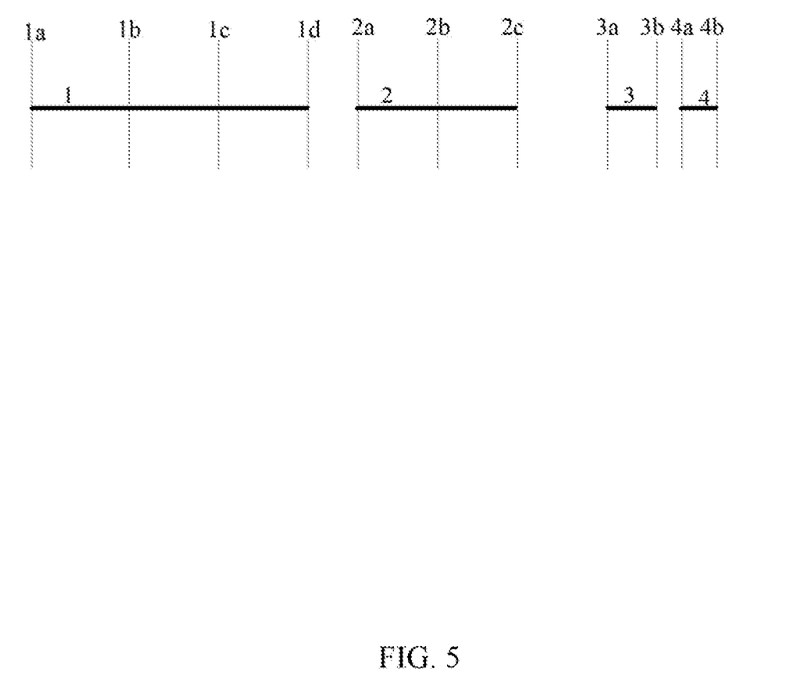
FIG. 5 is a schematic diagram of calculating image capturing conditions.

FIG. 5 is a schematic diagram of one embodiment of calculating image capturing conditions. The calculation module 109 calculates the image capturing conditions of the four continuous object distance collections represented by the lines 1-4. The line 3 represents calculating the image capturing condition one time, 3a is the front depth-of-field and 3b is the back depth-of-field. When the conditions calculated for the first time are adjustable, the calculation is finished. The line 4 also represents calculating one time. The line 2 represents calculating the image capturing conditions two times. When the conditions calculated by taking 2a as the front depth-of-field and 2c as the back depth-of-field are not adjustable, the calculation module 109 averages the line 2 into two pieces and calculates the conditions for two pieces separately. The calculation module 109 takes 2a as the front depth-of-field and 2b as the back depth-of-field, and takes 2b as the front depth-of-field and 2c as the back depth-of-field separately, and calculates the two conditions separately. The line 1 represents calculating the image capturing conditions three times. When the conditions calculated by the second time are not adjustable, the calculation module 109 averages the line 1 into three pieces and calculates the three conditions for the three pieces separately. The calculation module 109 takes the following as the front depth-of-field and the back depth-of-field separately: 1a, 1b; 1b, 1c; and 1c, 1d. When all the conditions have been calculated, each image captured condition corresponds to each piece of the object distance collection, and the times of the images being captured is equal to the total number of the image capturing conditions.

In one embodiment, the image capturing module 111 captures a plurality of images according to the image capturing condition to form an image array.

In the foregoing process of capturing images, the object distance collection, the corresponding image capturing conditions, and the corresponding images are all stored in the storage system 20.

In another embodiment, the image capturing device 10 further comprise a display module 113 operable to display the images that have been captured, and when the user selects one area of the image, the display module 113 picks and displays the corresponding image has been captured according to the image capturing condition of the selected area.

Figure 6:
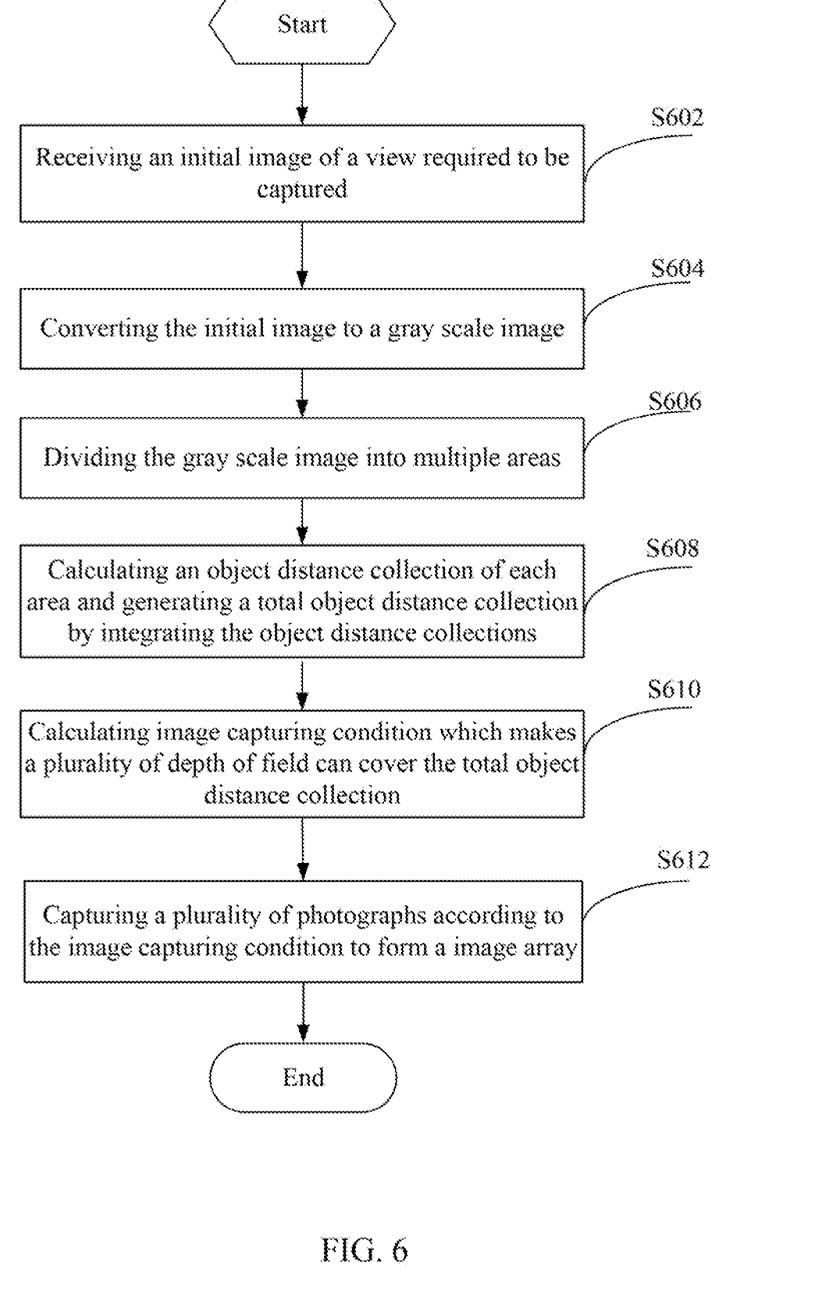
FIG. 6 is a flowchart of one embodiment of an image capturing method.

FIG. 6 is a flowchart of one embodiment of an image capturing method. In one embodiment, the method functions by modules in FIG. 1 in the following manner.

In block S602, the pre-taking module receives an initial image of a view the image capturing device will be capturing.

In block S604, the conversion module 103 converts the initial color image to gray scale image. Because the initial image can have different colors in different areas, after the gray scale transformation, the gray scale value of the different areas can be different. When the gray scale value has obvious changes between the different areas, multiple gray scale edges will form on the gray scale image.

In block S606, the division module 105 divides the gray scale image into multiple areas based on the gray scale edges.

In block S608, the ranging module 107 calculates an object distance collection of each area and generates a total object distance collection by integrating the object distance collections.

In block S610, the calculation module 109 calculates image capturing conditions which makes a plurality of depth-of-field cover the total object distance collection.

In block S612, the image capturing module 111 takes a plurality of image graphs according to the image capturing condition to form an image array.

In another embodiment, the image capturing method further comprises a display module 113 operable to display the images that have been captured, and when the user selects one area of the image, the display module 113 picks and displays the corresponding image according to the image capturing condition of the selected area.

The image capturing device and method can rule out the unwanted objects from view, reduce the number of times to capturing images, and reduce the time and the cost.

What is claimed is:

1. An image capturing device using depth-of-field, comprising:
   at least one processor;
   a storage system; and
   one or more programs that are stored in the storage system and executed by the at least one processor, the one or more programs comprising:
   a pre-capturing module to receive an initial image of a view required to be captured;
   a conversion module to convert the initial image to a gray scale image;
   a division module to divide the gray scale image into multiple areas;
   a ranging module to calculate an object distance collection of each area of the multiple areas and to generate a total object distance collection by integrating the object distance collections;
   a calculation module to calculate image capturing conditions which makes a plurality of depth-of-field cover the total object distance collection; and
   an image capturing module to capture a plurality of images according to the image capturing conditions to form an image array;
   wherein the calculation module calculates the image capturing conditions by using the formulas: the front depth-of-field=(H*D)/(H+D−F) and the back depth-of-field=(H*D)/(H−D−F), wherein D is the object distance, F is a focus distance, and H is a hyper focal distance dependent on an aperture coefficient of the image capturing device, and the image capturing conditions comprise the focus distance and the aperture coefficient of the image capturing device.

2. The image capturing device as claimed in claim 1, wherein the conversion module converts the initial image to the gray scale image by using the formula:
   Y=0.299R+0.587G+0.114B, I=0.596R−0.275G−0.321B, U=0.212R−0.528G−0.311B, wherein Y, I, U, R, G, and B represent the color standard.

3. The image capturing device as claimed in claim 1, wherein the gray scale image comprises multiple gray scale edges according to which the division module divides the gray scale image into multiple areas with continuous object distances.

4. The image capturing device as claimed in claim 1, wherein the ranging module combines object distances with overlap into one object distance collection and takes object distances without overlap as one object distance collection, wherein the total object distance collection are a collection of the object distances the ranging module generated.

5. The image capturing device as claimed in claim 4, wherein the calculation module selects one object distance collection from the total object distance collection and divides the object distance collection into N pieces averagely, wherein N is a positive integer starting from one.

6. The image capturing device as claimed in claim 5, wherein the calculation module takes the minimum of each piece of the selected object distance collection as a first depth-of-field, the maximum of each piece of the selected object distance collection as a second depth-of-field, and the average of the minimum and the maximum as the object distance to calculate the image capturing conditions.

7. The image capturing device as claimed in claim 6, wherein when the image capturing conditions cannot be set by the image capturing device, the calculation module divides the object distance collection into N+1 pieces averagely and calculates the image capturing conditions again until all the image capturing conditions are set, and selects the next object distance collection and calculates the image capturing conditions until all the image capturing conditions make the plurality of depth-of-field cover the total object distance collection.

8. The image capturing device as claimed in claim 1, wherein the one or more programs further comprise a display module operable to display the images that have been captured, and when one area of the image is selected by a user, the display module picks and displays the corresponding image that has been captured according to the image capturing condition of the selected area.

9. An image capturing method using depth-of-field, comprising:
   receiving an initial image of a view required to be captured;
   converting the initial image to a gray scale image;
   dividing the gray scale image into multiple areas;
   calculating an object distance collection of each area and generating a total object distance collection by integrating the object distance collections;
   calculating an image capturing condition which makes a plurality of depth-of-field cover the total object distance collection; and
   capturing a plurality of images according to the image capturing condition to form an image array;
   wherein calculating the image capturing condition which makes a plurality of depth-of-field cover the total object distance collection further comprises using the formulas: the front depth-of-field=(H*D)/(H+D−F) and the back depth-of-field=(H*D)/(H−D−F), wherein D is the object distance, F is a focus distance, and H is a hyper focal distance dependent on an aperture coefficient, and the image capturing conditions comprise the focus distance and the aperture coefficient.

10. The method as claimed in claim 9, wherein converting the initial image to a gray scale image further comprises using the formulas: Y=0.299R+0.587G+0.114B, I=0.596R−0.275G−0.321B, U=0.212R−0.528G−0.311B, wherein Y, I, U, R, G and B represent the color standard.

11. The method as claimed in claim 9, wherein the gray scale image comprises multiple gray scale edges, and dividing the gray scale image into multiple areas further comprises:

dividing the gray scale image into multiple areas with continuous object distances according to the gray scale edges.

12. The method as claimed in claim 9, wherein calculating the object distance collection of each area and generating the total object distance collection by integrating the object distance collections further comprises:

combining object distances with overlap into one object distance collection and taking object distances without overlap as one object distance collection, wherein the total object distance collection are a collection of the object distances.

13. The method as claimed in claim 12, wherein calculating the image capturing condition further comprises selecting one object distance collection from the total object distance collection and dividing the object distance collection into N pieces averagely, wherein N is a positive integer starting from one.

14. The method as claimed in claim 13, wherein calculating the image capturing condition further comprises taking a minimum of each piece of the selected object distance collection as a first depth-of-field, a maximum of each piece of the selected object distance collection as a second depth-of-field, and the average of the minimum and the maximum as the object distance to calculate the image capturing conditions.

15. The method as claimed in claim 14, wherein calculating the image capturing condition further comprises when the conditions cannot be set, dividing the object distance collection into N+1 pieces averagely and calculating the image capturing conditions again until all the image capturing conditions are set, then selecting the next object distance collection and calculating the image capturing conditions until all the image capturing conditions make the plurality of depth-of-field cover the total object distance collection.

16. The method as claimed in claim 9, further comprising displaying the images that have been captured, and when one area of the image is selected by a user, picking and displaying the corresponding image that has been captured according to the image capturing condition of the selected area.

* * * * *